United States Patent
Erzberger et al.

(10) Patent No.: US 6,393,358 B1
(45) Date of Patent: May 21, 2002

(54) EN ROUTE SPACING SYSTEM AND METHOD

(75) Inventors: Heinz Erzberger, Los Altos Hills; Steven M. Green, Sunnyvale, both of CA (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 0 days.

(21) Appl. No.: 09/629,123

(22) Filed: Jul. 31, 2000

Related U.S. Application Data

(60) Provisional application No. 60/146,502, filed on Jul. 30, 1999.

(51) Int. Cl.[7] .................................................. G01S 3/02
(52) U.S. Cl. .................... 701/120; 701/122; 701/10; 340/961; 342/29
(58) Field of Search ................................ 701/120, 121, 701/122, 4, 10, 14, 15, 16; 340/945, 961, 964, 967, 976; 342/29, 36, 37

(56) References Cited

U.S. PATENT DOCUMENTS

| | | | | |
|---|---|---|---|---|
| 4,839,658 A | * | 6/1989 | Kathol et al. | 342/455 |
| 5,659,475 A | * | 8/1997 | Brown | 701/200 |
| 5,732,384 A | * | 3/1998 | Ellert et al. | 701/210 |
| 6,081,764 A | * | 6/2000 | Varon | 701/120 |
| 6,199,008 B1 | * | 3/2001 | Aratow et al. | 701/120 |

OTHER PUBLICATIONS

Erzberger, H., et al., "Design of Center–TRACON automation System," on *Machine Intelligence in Air Traffic Management*, pp. 11–14, Berlin, Germany, May 11–14, 1993.

Green, S.M., et al., "Field Evaluation of Descent Advisor Trajectory Prediction Accuracy for En route Clearance Advisories," AIAA–98–4479, AIAA Guidance, Navigation, and Control Conference, pp. 1668–1685, Boston, Massachusetts, Aug. 1998.

Slattery, R. et al., "Conflict–Free Trajectory Planning for Air Traffic control Automation," NASA Technical Memorandum–108790, Jan. 1994.

Green, S.M., et al., "En route Descent Advisor (EDA) Concept," Advanced Air Transportation Technologies Project Milestone 5.10 Report, Sep. 1999, M/S 262–4, NASA Ames Research Center, Moffett Field, California, Sep. 1999.

Swenson, H.N., et al., "Design & Operational Evaluation of the Traffic Management Advisor at the Fort Worth Air Route Traffic Control Center," 1st USA/Europe Air Traffic Management R&D Seminar, Saclay, France, Jun. 1997.

McNally, B.D., et al., "A Controller Tool for Transition Airspace," AIAA–99–4298, AIAA Guidance, Navigation, and Control Conference, Portland, Oregon, Aug. 1999.

Erzberger, H., et al., "Conflict Detection and Resolution in the Presence of Prediction Error," 1st USA/Europe Air Traffic Management R&D Seminar, Saclay, France, Jun. 1997.

(List continued on next page.)

*Primary Examiner*—Tan Nguyen
(74) *Attorney, Agent, or Firm*—Robert M. Padilla

(57) ABSTRACT

A method of and computer software for minimizing aircraft deviations needed to comply with an en route miles-in-trail spacing requirement imposed during air traffic control operations via establishing a spacing reference geometry, predicting spatial locations of a plurality of aircraft at a predicted time of intersection of a path of a first of said plurality of aircraft with the spacing reference geometry, and determining spacing of each of the plurality of aircraft based on the predicted spatial locations.

32 Claims, 13 Drawing Sheets

OTHER PUBLICATIONS

Laudeman, I.V., et al., "An Evaluation and Redesign of the Conflict Prediction and Trial Planning Graphical User Interface," NASA Technical Memorandum–112227, Apr. 1998.

Klopfenstein, M., et al., "En route User Deviation Assessment," RTO–37 Final report, Contract # NAS2–98005, NASA AATT Project Office, NASA Ames Research Center, Moffett Field, California, Nov. 1999.

Erzberger, H., et al., "Design of an Automated System for Management of Arrival Traffic," NASA Technical Memorandum–102201, Jun. 1989.

* cited by examiner

EN ROUTE SPACING SYSTEM AND METHOD

This application claims the benefit of the filing of U.S. Provisional Patent Application Ser. No. 60/146,502, entitled "Conflict-Free Planning for En Route Spacing: A Concept for Integrating Conflict Probe and Miles-In-Trail", filed on Jul. 30, 1999, and the specification thereof is incorporated herein by reference.

ORIGIN OF INVENTION

The invention described herein was made by employees of the United States Government and may be manufactured and used by or for the Government for governmental purposes without payment of any royalties thereon or therefor.

BACKGROUND OF INVENTION

1. Field of the Invention (Technical Field)

The present invention relates to en route spacing of aircraft.

2. Description of the Prior Art

Note that the following discussion refers to a number of publications by author(s) and month and year of publication, and that due to recent publication dates certain publications are not to be considered as prior art vis-a-vis the present invention. Discussion of such publications herein is given for more complete background and is not to be construed as an admission that such publications are prior art for patentability determination purposes.

En route miles-in-trail (MIT) spacing restrictions are often used to distribute arrival delays upstream of destination airports and to mitigate local areas of en route airspace congestion. National statistics for the U.S. indicate that en route spacing restrictions are applied for approximately 5000 hours per month. These restrictions impact approximately 45,000 flights per month. Current-day practices for MIT-spacing increase controller workload, concentrate traffic unnecessarily, and degrade the performance of conflict-probe (CP) decision support. Today's procedures also result in inefficient conformance actions that directly impact the airspace user. It is estimated that the fuel penalty alone approaches $45 million per year.

A fundamental goal for en route decision support tool (DST) automation is to assist the controller in providing better Air Traffic Control (ATC) service (i.e., greater flexibility to airspace users and fewer ATC-related deviations to user's preferred trajectories) while increasing safety and productivity (i.e., reductions or shifts in controller workload that enable additional productivity). The economic benefits to airspace users come in the form of increased capacity/throughput, reduced restrictions and deviations (time and fuel consumption), and increased flexibility to plan and to fly aircraft.

There are many factors that impact air traffic operations, but primary factors include conflicts and Traffic Flow Management (TFM) flow-rate restrictions. Conflicts relate directly to safety while flow-rate restrictions relate directly to the efficient management of capacity-constrained resources (e.g., runways and sectors). Certainly the safety considerations alone warrant the community's past emphasis on conflict probe technology. However, in terms of mitigating user deviations, particularly in light of the projected rate of traffic growth, it is the flow-rate restriction that is at the core of unlocking user benefits. Although flow restrictions only impact a percentage of flights, the resulting deviations are significant compared to those required for maintaining basic radar separation. Furthermore, the lack of ATC-sector decision support for flow-rate conformance planning and execution results in a significant degradation in the performance of conflict probe. Conflict probe lacks the trajectory "intent" of the controller's plan for flow-rate conformance leading to the "conflict probing" of the "wrong" trajectories (thus increasing the probe's rate of false alarms and missed alerts). This degradation occurs in just the sort of "problem" airspace where the air transport industry needs automation assistance such as conflict probe.

It is particularly interesting to consider en route airspace that is subject to dynamic flow-rate restrictions related to local en route bottlenecks (e.g., sector overload) or the transition to/from high-density terminal-areas. NASA has been active in the development and evaluation of tools and techniques for efficient conflict-free planning in the presence of such constraints. The research is based on Center-TRACON Automation System (CTAS) technology. Erzberger, H., et al., "Design of Center-TRACON Automation System," AGARD Guidance and Control Symposium on Machine Intelligence in Air Traffic Management, Berlin, Germany, May 1993.

In general, two types of flow-rate restrictions must be considered. These include time-based arrival metering and en route miles-in-trail (MIT) spacing. Arrival metering tools for operations within the U.S. and Europe include the CTAS Traffic Management Advisor (TMA), COMPASS, and MAESTRO with future developments including Multi-Center TMA (U.S.) and Arrival Manager (Eurocontrol). Where operational, arrival metering is generally performed in en route airspace within the last 20 minutes of flight prior to entering terminal airspace. Even with arrival metering operations, many flights will still be subject to MIT-spacing restrictions. MIT-spacing procedures can be expected to play a predominant role for several reasons. The first is the ATC-operational need to merge departures with en route traffic that is "spaced" for downstream capacity limitations. Second, the limited number of arrival-metering sites (i.e., CTAS-TMA-adapted airports) leaves the remaining airports to depend on MIT-spacing procedures. Third, there is a need to occasionally propagate delays upstream of terminal airspace prior to the arrival-metering horizon. As traffic growth outpaces capacity, more flights will be affected by dynamic flow-rate initiatives including MIT-spacing restrictions.

Much of the en route decision support tool effort within the U.S. and Europe has focused on near-term implementations of conflict probe and arrival metering capabilities. There has been some long-term progress towards the development of advanced advisory tools that integrate capabilities for conflict detection/resolution and flow-rate conformance for arrival metering. Green, S. M., et al., "Field Evaluation of Descent Advisor Trajectory Prediction Accuracy for En route Clearance Advisories," AIAA-98-4479, AIAA Guidance, Navigation, and Control Conference, Boston, Mass., August 1998; Slattery, R. et al., "Conflict-Free Trajectory Planning for Air Traffic Control Automation," NASA TM-1 08790, January 1994; Green, S. M., et al., "En route Descent Advisor (EDA) Concept," Advanced Air Transportation Technologies Project Milestone 5.10 Report, September 1999, M/S 262-4, NASA Ames Research Center, Moffett Field, Calif.; and Swenson, et al., "Design & Operational Evaluation of the Traffic Management Advisor at the Fort Worth Air Route Traffic Control Center," 1st USA/Europe Air Traffic Management R&D Seminar, Saclay, France, June 1997. The Descent Advisor tool of Green et al. (now referred to as the En route/Descent Advisor (EDA)) has undergone many refinements to its controller interface, trajectory planning, and conflict-probe capability to support near-term operational implementation of simple spin-off capabilities. McNally, B. D., et al., "Controller Tools for Transition Airspace," AIAA-99-4298, AIAA Guidance, Navigation, and Control Conference, Portland, Oreg., August 1999; Erzberger, H., et al., "Conflict Detection and Resolution In the Presence of Prediction Error," 1st USA /Europe Air Traffic Management R&D Seminar, Saclay, France, June 1997; and Laudeman, I. V., et al., "An Evaluation and Redesign of the Conflict Prediction and Trial Planning Graphical User Interface," NASA TM-112227, April 1998. However, there has been little effort on near-term controller tools to assist with flow-rate conformance, let alone integration with conflict detection/resolution. Furthermore, there has been no emphasis on the en route spacing problem.

In the U.S., traffic management coordinators (TMCs) within each ATC facility are responsible for coordinating MIT-spacing initiatives within their facility when needed. Dynamic initiatives are either generated within the facility (e.g., local arrival spacing to a non-metered airport), received from neighboring facilities, or coordinated through the ATC System Command Center (ATCSCC). MIT-spacing restrictions are defined in terms of a stream of flights, spacing-reference fix, active period, and a spacing requirement (e.g., 20 nm in trail). Restrictions may also segregate streams by altitude stratum and/or arrival routing.

Once an MIT-spacing restriction is initiated, local TMCs identify the flights within their facility that are affected by the restriction. TMCs then coordinate re-routes to form "freeways in the sky" that allow sector controllers to visualize the stream and determine the maneuvers necessary for conformance. Controllers primarily use vectors to establish and maintain the desired spacing. The "path-dependent" nature of this process makes MIT-spacing restrictions operationally feasible to implement, monitor, and control across sector boundaries, with little or no automation assistance.

TMCs assess each MIT-spacing situation and determine the appropriate sectors, upstream of the spacing-reference fix, to begin coordinating controller actions for conformance. This effective range (or time horizon) for controller conformance depends on the available airspace and the magnitude of delays. Traffic streams nominally have a natural spacing: the greater the difference between the nominal and required spacing, the greater the delay resulting from conformance. Depending on the magnitude of the delays and available airspace, it may be necessary to propagate MIT-spacing restrictions to upstream facilities via "pass-back" restrictions (with coordination facilitated by the ATCSCC).

FIG. 1 illustrates an example scenario for Chicago's O'Hare Airport where it is not uncommon for delays to propagate upwards of 1000 nm upstream. The "delayability" of a flight (i.e., the operationally acceptable amount of delay that can be absorbed) grows with the range-to-go and airspace capacity. As terminal-area delays grow, Chicago Center must throttle the arrival flow. Even with airborne holding, the back up of arrival traffic can saturate the airspace. Chicago Center then coordinates a restriction with Minneapolis Center to space incoming arrivals (e.g., 10 MIT by Fort Dodge (FOD)). Depending on the situation, Minneapolis may in turn need to slow the rate of incoming traffic from Denver Center (e.g., 20 MIT by Oneil (ONL)).

Even if high-density terminal areas (such as Chicago) convert to time-based arrival metering, MIT-spacing initiatives still provide TMCs with an effective means for dynamically distributing excess delay upstream. MIT initiatives have a significant operational advantage in that they are relatively straightforward to delegate (within and between ATC facilities), implement, and monitor. When flights are formed into in-trail streams, controllers are able to visualize and control spacing at the sector without automation assistance.

The frequency, source, and impact of MIT initiatives vary widely from day to day as dynamic changes in traffic load exceed airspace capacity (primarily due to weather). National statistics for 1998, "Quarterly Restriction Report, Third Quarter 1998," Federal Aviation Administration David J. Hurley Air Traffic Control System Command Center (ATO-200), Reston, Va., indicate that the number of restriction hours averaged approximately 5000 hours per month (plus or minus 15%).

A detailed study of Denver Center operations was conducted to estimate the number of flights impacted by MIT restrictions within that facility. The objective was to estimate the frequency with which MIT-spacing restrictions were imposed and the number of flights affected. The study focused primarily on traffic to the top four destination airports that resulted in restrictions on Denver Center: Los Angeles (LAX), Chicago (ORD), Dallas/Ft. Worth (DFW), and Las Vegas (LAS). Data was collected for June 1996. These data included the Traffic Management Unit (TMU) logs (noting the duration and nature of MIT restrictions), and recordings of the hourly sector traffic count as a function of destination.

FIG. 2 presents the results from the study in terms of a three-dimensional pie chart to illustrate the average daily volume of impacted flights. The cross section of each column indicates the percentage of days for which MIT initiatives were active. The radius indicates the average number of flights per hour affected by restrictions for that airport. The column height represents the average duration of initiatives on an active day. Some active days involve multiple initiatives (e.g., Chicago may call for restrictions for 60 min in the morning and 90 minutes in the afternoon).

On a weekly basis, the figure indicates that 163 flights within Denver Center are affected by MIT-spacing restrictions for the top four destination airports. The number of flights per hour affected by restrictions averaged 10 for LAX, 10 for ORD, 9 for LAS, and 8 for DFW. The combined data for the four destinations indicate that approximately 9 flights per restriction hour were affected by spacing initiatives. Although restrictions tend to be relatively heavy for the month of June (due to thunderstorm impact on sector capacity), these results were relatively light and considered to be representative of the annual average for Denver.

An additional study, Klopfenstein, M., et al., "En route User Deviation Assessment," RTO-37 Final Report, Contract # NAS2-98005, NASA AATT Project Office, NASA Ames Research Center, Moffett Field, California, November 1999, performed a nation-wide analysis of the frequency of, number of flights impacted by, and reasons for MIT restrictions. The data set included ATCSCC logs of imposed MIT restrictions as well as flight plan and track data archived from the En route Traffic Management System (ETMS). The study analyzed 54 days of traffic, sampled between November 1998 and October 1999, representing the gamut of operations (peak holiday traffic, severe weather, and routine operations). The number of restrictions implemented per day ranged from 69 to 346 with an average of 186. These restrictions impacted an average of 13.5 aircraft per restriction with an average rate of 8.5 flights per restriction hour.

Table 1 presents the top four categories of restrictions noted in the traffic management logs. These account for 85% of the restrictions studied. Approximately two thirds of the restrictions were attributed to traffic volume and weather. Whereas the weather category captures situations involving reduce airspace capacity due to weather, the volume category captures situations involving excess volume. The next largest categories, traffic demand and reduced airport acceptance rate (AAR) contributed to 21% of all restrictions. The AAR category captures situations involving delays due to a reduction in airport capacity. A clear definition of the demand category was never found. In total, these top four categories impacted approximately 2.4% of all flights within the national airspace system (NAS).

TABLE 1

Top four categories for MIT restrictions.

| Reason | Number of restrictions | % Total | Number of Flights | % NAS Total* |
|---|---|---|---|---|
| Volume | 388 | 33% | 2621 | 0.9% |
| Weather | 362 | 31% | 2097 | 0.7% |
| Demand | 158 | 13% | 1703 | 0.6% |
| AAR | 91 | 8% | 702 | 0.2% |
| Total | 999 | 85% | 7123 | 2.4% |

*% of all flights within the national airspace system.

Table 2 categorizes the same data set by destination. Traffic streams are often defined by destination even though many restrictions are not directly related to the destination itself. This enables traffic managers to quickly identify flight groups that, if restricted, will solve the problem with one restriction. This "least common denominator" also simplifies the communication of the restriction to other traffic managers and individual sectors. Although this technique may not result in an equitable distribution of delay, it is a practical approach that has evolved from operational necessity.

TABLE 2

Number of MIT-impacted flights by destination.

| Airport | Number of restrictions | % Total | Number of Flights |
|---|---|---|---|
| Chicago | 164 | 14% | 2621 |
| Cincinnati | 126 | 11% | 982 |
| Atlanta | 119 | 10% | 2119 |
| Detroit | 78 | 7% | 856 |
| Dulles | 70 | 6% | 1341 |
| Total | 557 | 47% | 7919 |

Chicago and Atlanta arrivals account for nearly one fourth of all MIT restricted flights. This is not surprising given their status as two of the busiest hub airports: airport delays impact a large number of flight arrivals; and for en route delays, changes to their arrival streams can effect a significant change to the traffic environment.

Although today's "manual" MIT-spacing techniques are straightforward to implement, there are several disadvantages related to their path-dependent nature. From the airspace-user's point of view, deviations from their preferred trajectory come in three forms:

TMC-initiated re-routes to establish a stream;

controller vectors to establish spacing; and controller vectors for conflict resolution.

FIGS. 3 and 4 illustrate the problem. Three flights are initially on user-preferred eastbound routes. The circles indicate the relative sequence of the un-delayed flights when the first flight crosses the boundary. The natural order of arrival at the boundary is B, C, and A. Consider the situation where the downstream center (ARTCC 2) imposes an MIT-spacing restriction at the boundary. Without automation assistance, it would be difficult for sector controllers to visualize and space their flights relative to flights in other sectors that are orthogonal to the flow. Referring to FIG. 3, the controller in sector 2 would have difficulty in spacing B relative to A or C. To overcome this problem, TMCs coordinate the re-routing of A and C (FIG. 4) to form a stream that can be visualized and controlled by sectors 2 and 5. Depending on the natural distribution of flight paths, these re-route actions add a significant penalty.

Once streams are formed, spacing adjustments typically involve vectors. Although speed control can help fine-tune spacing under current procedures, it is often too little to establish spacing because of performance mismatches and limited range within a sector (for speed changes to take effect). In-trail flows also reduce the opportunity for faster aircraft to pass slower ones when the faster aircraft would naturally arrive first at the spacing-reference fix. Once spacing is established within a stream, additional deviations may result from conflicts with crossing traffic.

From the ATM point of view, current-day spacing procedures present several disadvantages. First is the workload required to establish the stream. Second, controllers must rely on tactical techniques to establish spacing based on experience and trial and error. Third, in-trail techniques force flights into streams that concentrate traffic density and workload in the "spacing" sectors as opposed to distributing flights across sectors. Finally, the spacing sectors are impacted in terms of conflict detection and resolution because the tactical nature of current-day spacing techniques negatively impacts the operational use of CP tools.

Regarding conflict detection, consider the situation illustrated in FIG. 5. The two eastbound flights are subject to a spacing restriction while the other two flights represent crossing traffic. The solid lines indicate the path used by CP. The spacing-conformance path for the first eastbound flight is also shown in a dashed line. CP has no knowledge of the controller's plan for spacing conformance until the conformance maneuvers are completed. More often than not, such plans are not updated or reflected in the ATC Host computer. This is due to several factors including the controller workload associated with flight plan amendments and the difficulty controllers would have in reflecting today's relatively tactical spacing techniques in a flight-plan amendment. As a result, CP may experience a greater rate of false alarms (due to the lack of spacing-conformance intent) and missed alerts (if the controller's conformance actions result in a new conflict).

With the present invention, in the near term, there are many opportunities to enhance current and emerging technologies such as those being deployed in the U.S. under the FAA's Free Flight Phase 1 (FFP1) program. For the purposes of the specification and claims, Conflict Probe (CP) refers to a basic en route conflict-probe capability. CP assists the controller by predicting problems based on flight plans and radar-track data (e.g., loss of minimum-required separation between two flights) and providing trial-planning support to formulate and coordinate resolution actions.

Two near-term enhancements to CP technology provided by the present invention can go far in reducing user deviations from their preferred trajectories. First, a tool is provided to help en route controllers efficiently conform to flow-rate restrictions. This will enable controllers to strategically plan conformance actions resulting in reduced workload, flight deviations and fuel consumption. The second enhancement to CP involves the integration of conflict detection and resolution capability with flow-rate conformance. Integration will further reduce fuel consumption and workload by reducing the conflict-probe false-alarm and missed-alert rates. This improved accuracy, due to better knowledge of the controller's intended conformance actions, will reduce the number of corrective clearances needed to achieve flow-rate conformance while avoiding conflicts. As a first operational step, there should be a large return on investment in applying CP technology (conflict detection and trial planning) to flow-rate conformance. Although the manual trial-planning approach is too cumbersome for arrival metering (which involves complex trajectory-planning challenges with high densities due to traffic compression and merging near the terminal area), CP technology lends itself well to en route spacing operations, as demonstrated by the present invention.

Another enhancement provided by the present invention is the addition of automatic "meet-spacing" advisory capabilities to reduce controller work in manually trial planning spacing conformance solutions. The invention provides for automated advisories (a la EDA milestone 5.10 techniques) to advise combined speed, altitude, and/or path-stretch vectors to achieve spacing conformance. The EDA techniques described in Erzberger, H., et al., "Design of an Automated System for Management of Arrival Traffic", NASA TM-102201, June 1989, focused on arrival spacing only (not en route and departure), along fixed arrival routes only (not flexible paths), and only offered limited descent-speed advisories. Other references relating to the EDA techniques are Green, S., et al., "Field Evaluation of Descent Advisor Trajectory Prediction Accuracy for En route Clearance Advisories," AIAA-98-4479, AIAA Guidance, Navigation, and Control Conference, Boston, Mass., August 1998; Slattery, R. et al., "Conflict-Free Trajectory Planning for Air Traffic Control Automation," NASA TM-108790, January 1994; and Green, S. M., et al., "En route Descent Advisor (EDA) Concept," Advanced Air Transportation Technologies Project Milestone 5.10 Report, M/S 262-4, NASA Ames Research Center, Moffett Field, California.

SUMMARY OF THE INVENTION

The present invention is of a method of, and a system and software for, minimizing aircraft deviations needed to comply with an en route miles-in-trail spacing requirement imposed during air traffic control operations, comprising: establishing a spacing reference geometry; predicting spatial locations of a plurality of aircraft at a predicted time of intersection of a path of a first of said plurality of aircraft with the spacing reference geometry; and determining spacing of each of the plurality of aircraft based on the predicted spatial locations. In the preferred embodiment, the spacing reference geometry can be any of fixed waypoints, including navaids, airway intersections, and predetermined latitude/longitude positions, airspace sector boundaries, arcs defined in reference to an airport or other geographical location, spatial lines, and combinations of spatial line segments. Both predicted spatial locations and determined spacing of each aircraft are displayed, with the determined spacing preferably in an alphanumeric format on a predetermined location on a display in list form, on the flight data tags of a primary traffic ("R"-side) display, on the primary traffic ("R"-side) display on or near the aircraft target, on flight-progress strips, and/or on URET CCLD displays. A proposed alteration in flight characteristics (course, speed, altitude, and combinations thereof) of one or more of the aircraft may be set, after which locations and spacings are recalculated based upon the proposed alteration, thereby providing feedback as to conformance of the proposed alteration with the spacing requirement, and preferably together with employing a conflict probe to predict aircraft conflicts in view of the proposed alteration. The controller may specify whether the spacing determination employs spacing calculation parameters including rolling spacing, fixed spacing, absolute spacing-distance, and relative spacing distance parameters. A meet-spacing requirement may be imposed, whereby changes to course, speed, and altitude for one or more of the plurality of aircraft are automatically proposed to a controller that would meet the spacing requirement. The aircraft may be selected by a matching aircraft to input stream characteristics, as well as by directly identifying flights by controller input, and the selection may be reperformed at repeated intervals. Spacing advisory data is preferably reported to other controllers responsible for monitoring each aircraft. The software of the invention is preferably a modular component of a Center-TRACON Automation System. The invention is additionally of computer media comprising the computer software of the invention.

The invention is further of a computer system comprising one or more central processing units, one or more displays, one or more input devices, an en route miles-in-trail planning software component, and a conflict probe component.

A primary object of the present invention is to provide to en route controller a system and method to efficiently conform to miles-in-trail (MIT) spacing restrictions.

An additional object of the present invention is to provide such controllers with a system and method that also is integrated with conflict probing to reduce its false-alarm and missed-alert rates.

A primary advantage of the present invention is that it reduces workload and fuel consumption by reducing the number of corrective clearances (needed to achieve flow-rate conformance while avoiding conflicts) and the more efficient distribution of spacing workload upstream and across sectors.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DETAILED DESCRIPTION OF THE INVENTION

Best Modes for Carrying Out the Invention

The present invention is of an en route spacing system and method to help en route controllers efficiently conform to miles-in-trail (MIT) spacing restrictions. Integration with conflict probe reduces the probe's false-alarm and missed-alert rates due to better knowledge of the controller's intended actions for spacing conformance. Integration further reduces workload and fuel consumption by reducing the number of corrective clearances needed to achieve flow-rate conformance while avoiding conflicts.

Figure 1:
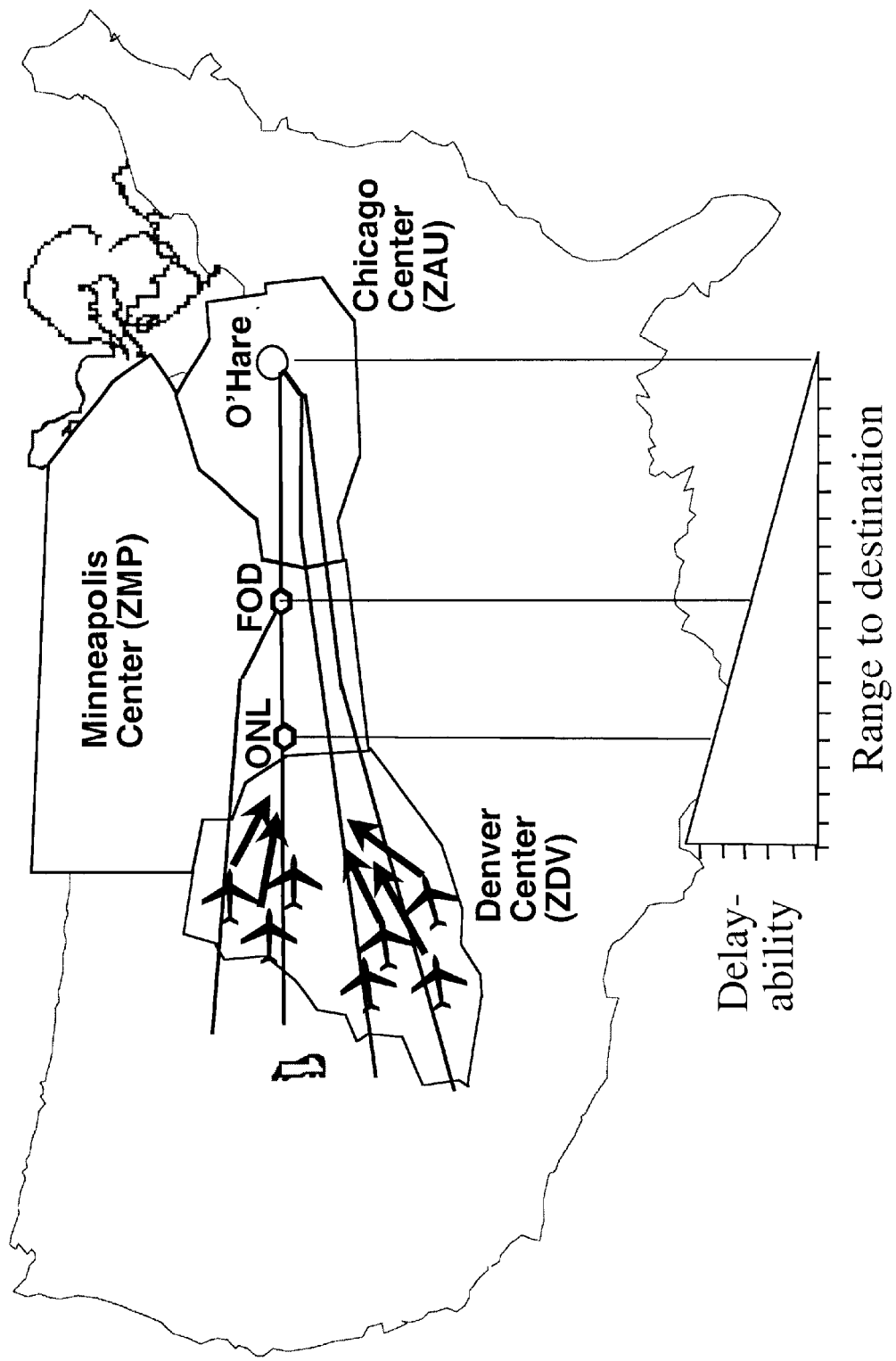
FIG. 1 illustrates en route coordination of spacing delays.
Figure 2:
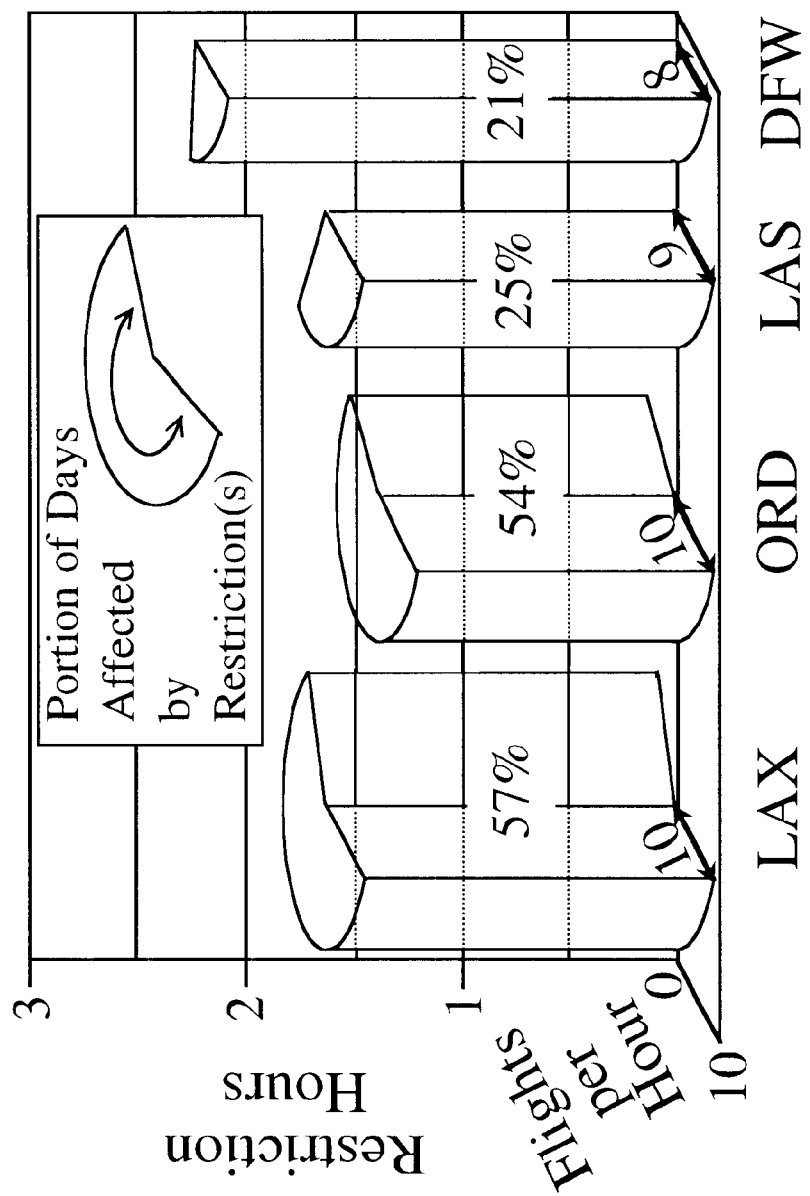
FIG. 2 illustrates Denver Center MIT restrictions from data in June 1996.
Figure 3:
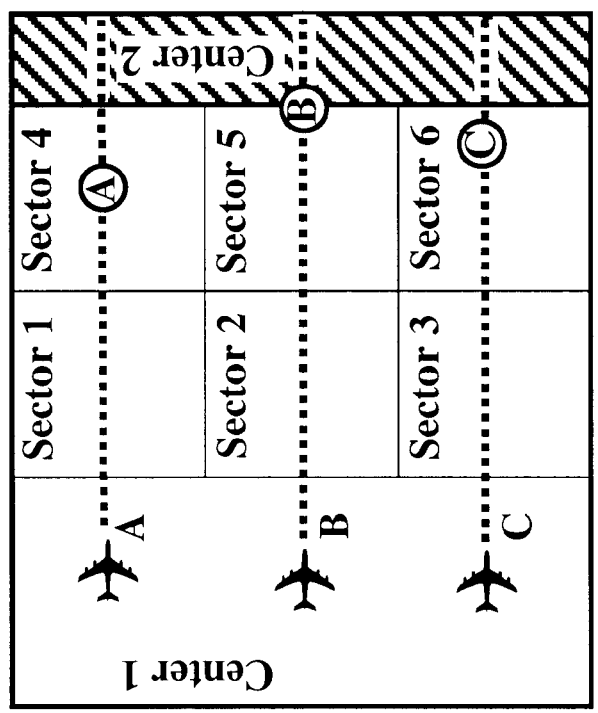
FIG. 3 illustrates user-preferred routes in a hypothetical scenario.
Figure 4:
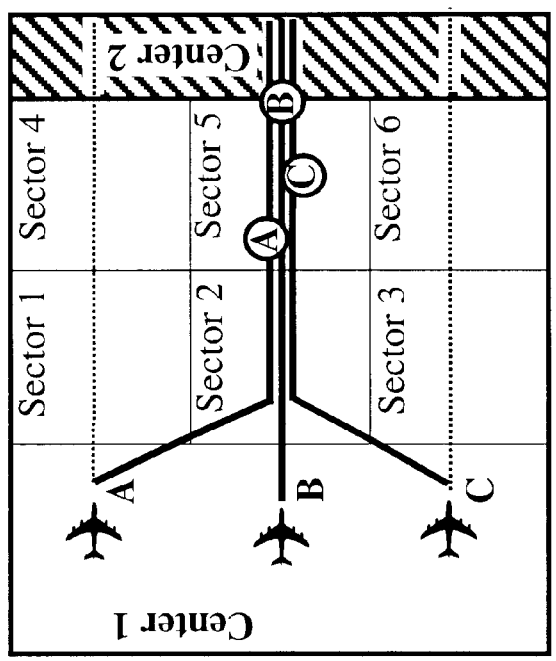
FIG. 4 illustrates re-routes to form a spacing trail in the scenario of FIG. 3.
Figure 5:
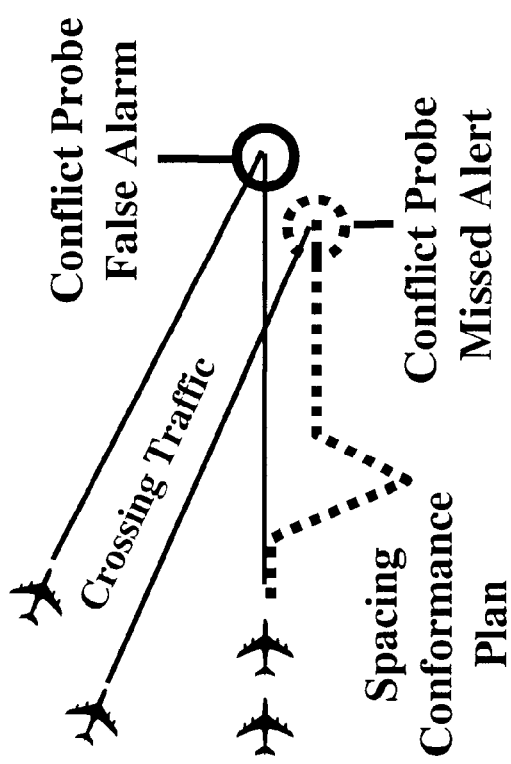
FIG. 5 illustrates spacing impacts on CP accuracy.
Figure 6:
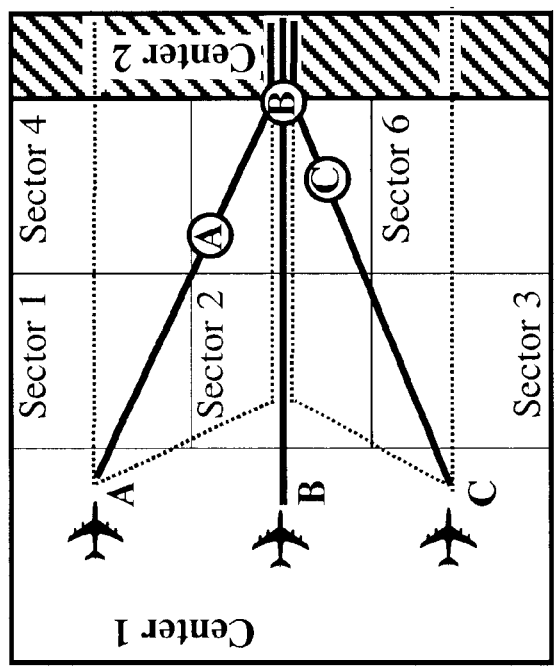
FIG. 6 illustrates spacing with minimum deviation.

The disadvantages of today's MIT-spacing procedures may be overcome by a simple application of the 4D trajectory-prediction and trial-planning capability associated with CP technology. Such application may be applied to any baseline ATM Decision Support System, including CTAS, URET, or systems of a similar nature (URET is a conflict probe tool originally developed at Mitre-CAASD and implemented by the FAA as part of the Free Flight Phase 1 program). FIG. 6 illustrates the desired situation, assuming that the downstream "receiving" facility will still require an in-trail stream at the hand off to their facility. As long as the tools and procedures result in conformance prior to the spacing-reference fix, each of the cross-stream sectors may work their flights independently and thus delay the merge until the spacing-reference fix.

Figure 7:
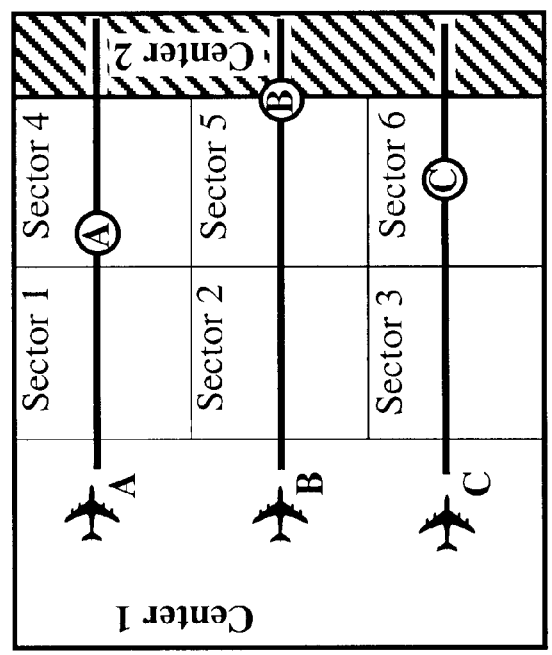
FIG. 7 illustrates path-independent spacing.

Additional benefits can be achieved if the downstream "receiving" facility relaxed the requirement for an in-trail flow at the hand off. At the theoretical extreme, the automation could help controllers deliver an "equivalent" spacing across a "wide" stream of flights (FIG. 7) with the absolute minimum deviation from each user's preferred route. Of course, depending on the amount of delay required (i.e., relative to the aircraft's performance and speed envelope), a certain amount of vectoring may be necessary to space each flight. FIG. 7 approaches the user-desired concept of "free routing" where flow-restrictions are implemented, as needed, with required time-of-arrival (RTA) assignments. In fact, spacing solutions could be used to determine RTA assignments for equipped aircraft.

FIGS. 6 and 7 illustrate several of the advantages to the spacing approach of the invention. First, the degree of route deviations required for spacing conformance is minimized. Second, the traffic density and spacing workload is distributed across more sectors. This distribution of flights reduces the impact of dissimilar speeds among sequential flights in a stream, thus allowing more opportunity for natural overtakes. It also provides for a more equitable distribution of delays based on the nominal performance of the aircraft. In addition, the integration of CP and spacing-conformance tools will result in more efficient trajectories with fewer false alarms and missed alerts.

One of the benefits of applying CP technology to the conflict-free planning of MIT-spacing conformance is the reduction of path deviations for both stream formation and spacing adjustment. By allowing flights to remain on independent paths (delaying any merge until the spacing-reference fix), speed control may be exercised more effectively and to an economic advantage.

Consider a typical flight impacted by a spacing restriction on a standard-atmosphere day with no wind. Assume a medium-sized commercial jet with a nominal cruise speed of Mach 0.82 (approximately 475 knots true airspeed at flight level 350) and a fuel burn of approximately 7000 lb/hr (at a cost of $0.10/lb of fuel). Additional assumptions include an average spacing delay of 3 min per flight, and a conformance horizon of 200 nm (i.e., the range between the start of spacing maneuvers and the spacing-reference fix). This range corresponds to a nominal time-to-fly of 25.3 minutes.

If speed control were to be used instead of vectors, the aircraft could absorb all of the delay with a speed reduction to 250 knots indicated (approximately 424 knots true airspeed). This speed reduction would reduce the rate of fuel consumption by approximately 25% resulting in fuel savings of 825 pounds. These results are based on a computer simulation of aircraft performance for a typical medium-sized jet transport. Considering an average national rate of 5000 restriction hours per month, impacting an average of nine flights per restriction hour, a spacing tool implementation could save $44.6 million per year in fuel alone.

Figure 8:
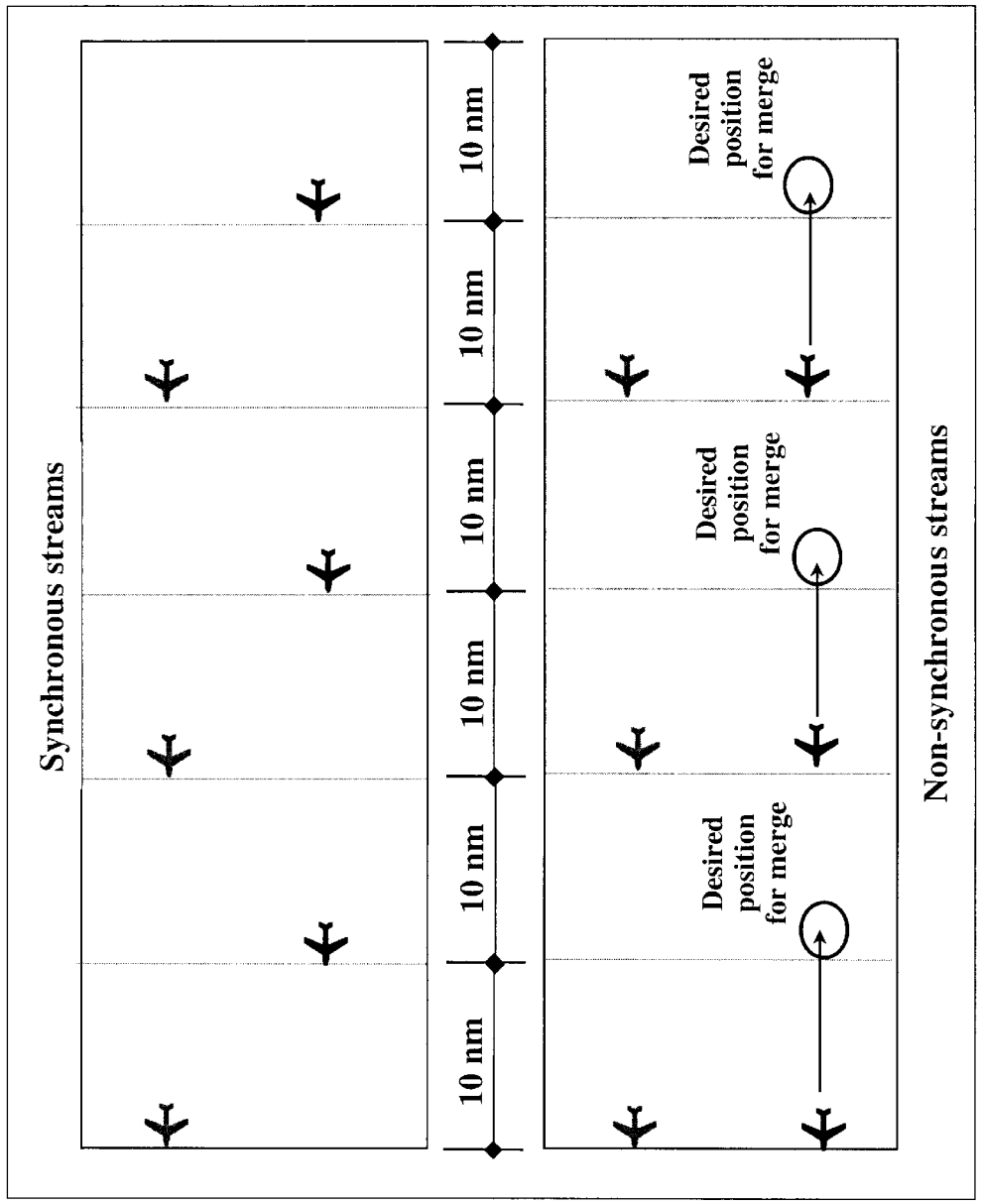
FIG. 8 illustrates the convergence of synchronous streams.

This estimate only represents one benefit mechanism of value. Additional fuel savings (not counted here) would be gained by a reduction in the major re-routings required for some "off route" flights to join in-trail streams. Other fuel and workload savings would be realized when traffic streams must be merged. For example, consider FIG. 8 which illustrates two west-bound streams. In anticipation of a later merge with a net spacing of 10 nm, each stream is restricted to a 20 nm spacing. If the streams happen to be synchronized (coincidentally), there will be little downstream effort needed to achieve a single flow with 10 nm spacing. However, if the flows are not synchronized, controllers will be forced to delay flights to merge the streams. Since the Spacing Tool provides guidance for spacing conformance independent of routing, it enables the controllers to synchronize the 10 nm spacing up front.

Aside from direct fuel savings, the invention reduces the uncertainty associated with today's methods for monitoring and control of critical traffic streams. Improvements to the ability to monitor and control flow rates provide TMCs with the confidence to reduce the frequency and extent of MIT-spacing restrictions. Although difficult to measure, there is additional value associated with the tool's ability to increase the conflict-probe performance and lower traffic densities across sectors.

Initially, CP technology (in the form of the User Request Evaluation Tool (URET) is being deployed as a "D-side" tool under the FAA's Free Flight Phase 1 program. Each en route sector has two primary controller positions/roles: the R-side and D-side. The R-side monitors the plan view radar display and issues all clearances to the aircraft in the sector. In general, the D-side complements the R-side by analyzing the flight plans of incoming traffic, coordinating upstream changes to protect the sector (R-side) from high workload situations, and other duties to allow the R-side to focus on the tactical situation. During light traffic periods, one controller performs both positions, during heavy periods, additional controllers may help the sector team to handle the workload.

Initial CP problem-resolution capability is based on a "manual" trial-planning process. The controller uses a graphical user interface to trial plan changes in route, altitude, and speed. Problems include the predicted loss of separation between two flights (i.e., a conflict) and penetration of special use airspace. Compared to the manual process that D-side controllers perform with flight plans, CP represents a significant improvement to the operational system. However, the time consuming nature of the trial-planning process may reduce its usability during high-workload, high-density-traffic situations.

For applications to arrival metering, it may not be feasible to apply the trial planning process to metering conformance. The arrival-metering horizon is relatively close to terminal airspace (generally within 20 minutes) resulting in a high concentration of arrivals (per sector) to plan. In addition, the arrival phase of flight is far more complicated to plan accurately than the cruise phase. Finally, compression of traffic through fixed arrival gates results in tighter inter-stream spacing near the terminal area than farther upstream. In order to feed the runway capacity, the target spacing at the terminal boundary can easily approach the minimum standard for en route separation (5 nm), leaving little room for uncertainty in the trajectory plan. Recent controller simulations and field tests have confirmed the difficulties associated with trial planning for arrival metering. McNally, B. D., et al., "Controller Tools for Transition Airspace," AIAA-99-4298, AIAA Guidance, Navigation, and Control Conference, Portland Oreg., August 1999.

CP technology is usefully applied to the en route spacing problem, as shown in the present invention. Compared to arrival metering, en route spacing is often initiated farther upstream where traffic is distributed across a larger airspace resulting in fewer aircraft to delay per sector. The development of a spacing tool can help reduce sector densities further as flights are left on their routes longer. Furthermore, en route spacing requirements are generally much larger than the minimum standard for radar separation: 5 nm. The compression of traffic for arrival metering, on the other hand, typically approaches this minimum-separation standard. As a result, en route spacing often demands less precision (for any individual flight) than arrival metering. Controllers have greater flexibility in achieving en route spacing conformance as long as they deliver the overall flow rate. For example, consider a stream of flights subject to a 10 nm spacing restriction. If the first two flights are spaced by 8 nm, and the third is spaced by another 12 nm, the controller has still conformed to the general flow rate without violating the minimum-separation standard. The combination of a relatively simple phase of flight (i.e., cruise), fewer flights to plan, and the relatively large amount of "wiggle" room for flow-rate conformance greatly increases the feasibility of applying CP technology to the MIT-spacing problem as opposed to arrival metering.

An en route spacing function according to the invention was implemented within the CTAS baseline, and is reproducible without undue effort by one of ordinary skill in the art based upon the disclosure of the present application and the references cited herein. This function allows a controller employing a CTAS system (not shown, or system with similar functionality) to identify a stream of traffic and a spacing-reference fix within or beyond the boundaries of their sector. The reference fix may be an arbitrary position, defined by the controller, independent of any one flight's airway or routing. Streams may be defined to include flights on independent paths (i.e., paths that are not constrained to any one airway, routing, or common fix). The invention allows for a stream to be comprised of aircraft in the climb, cruise, and/or descent phase of flight. This enables the same tool to be applied to problems involving en route spacing, arrival spacing, and the merging of departures into an en route stream. The subtle variations in along-path predictions may be accounted for within the supporting trajectory-prediction functions (i.e., variations in ground speed due to winds and lateral path, true airspeed profile, and aircraft performance in the case of climb/descent segments).

Figure 9:
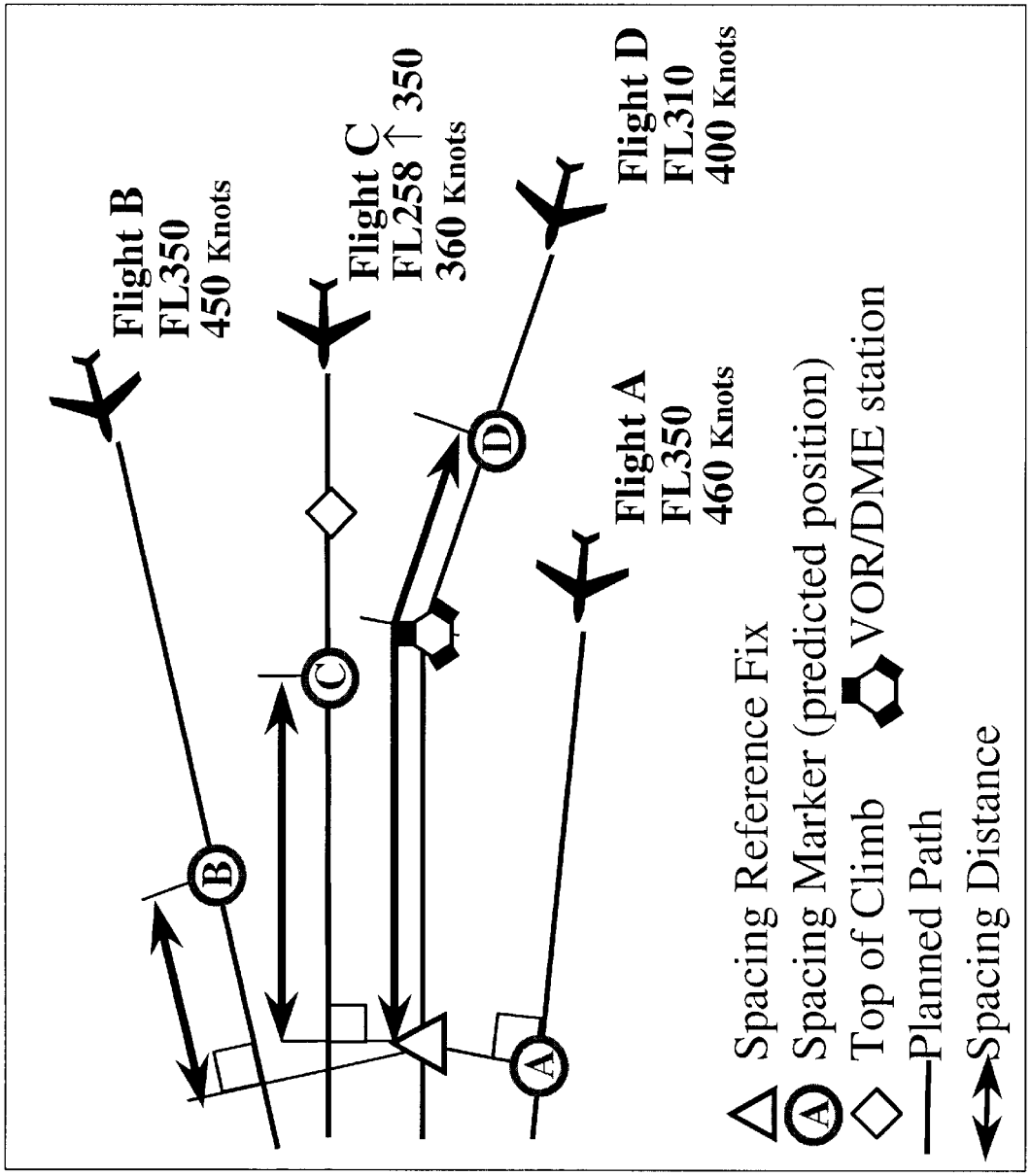
FIG. 9 illustrates the generalized spacing-fix method of the invention.

FIG. 9 illustrates spacing computation based on a reference fix. A spacing prediction is made for each flight in the stream when the first flight (or next flight) is predicted to cross abeam the spacing-reference fix. A corresponding spacing marker shows the predicted-spacing position of each flight when the first flight in the stream passes abeam the reference fix. If a controller vectors or assigns a new speed/altitude to a flight, this predicted spacing position is updated to reflect the changes to that flight's predicted trajectory. The "equivalent" in-trail spacing is computed for each flight based on the along-track distance from its predicted spacing position to its future position abeam the control fix. In this case, the figure illustrates a spacing merge of a departure (flight C) into an en route stream comprised of flights A, B, and D.

Figure 10:
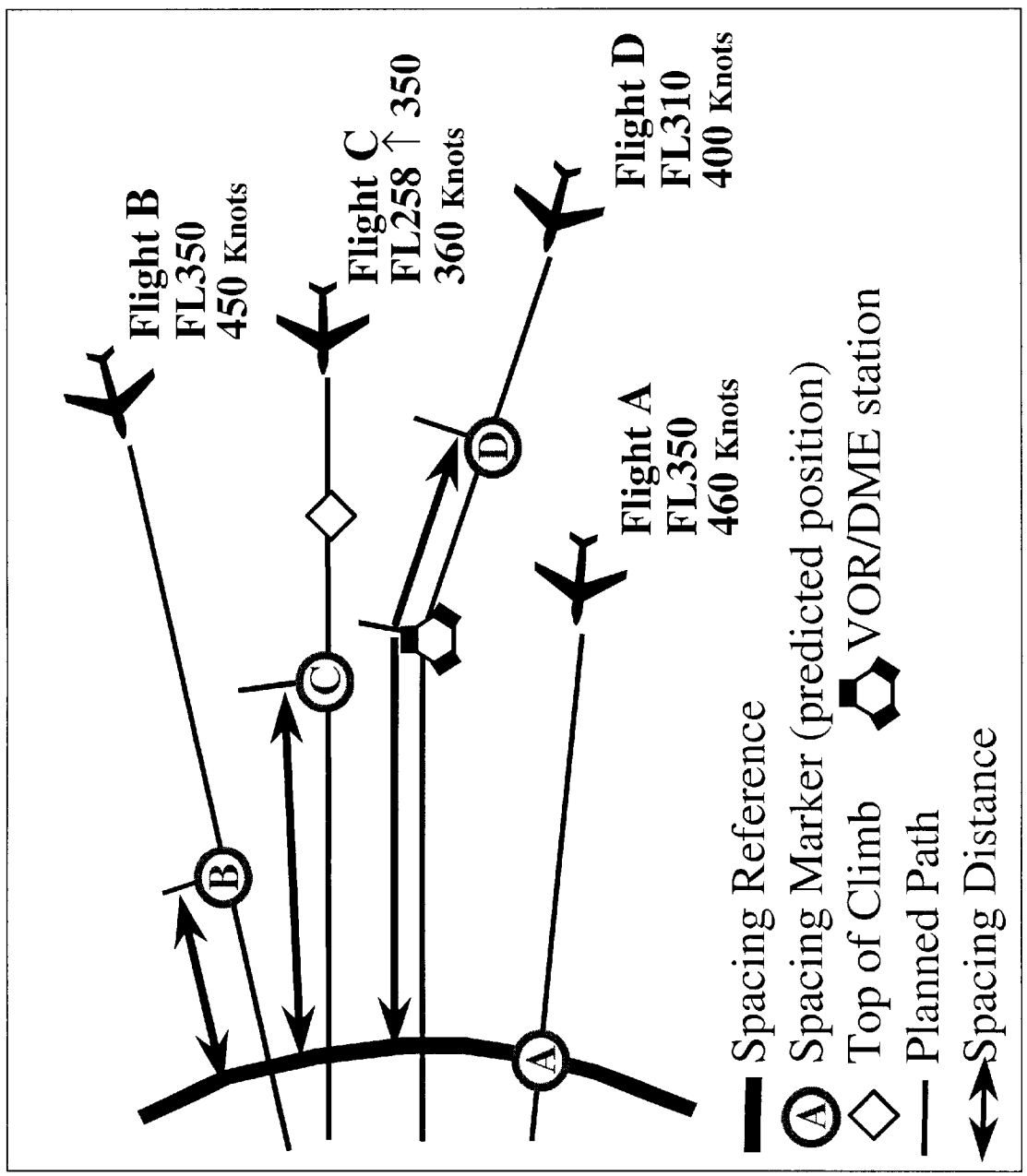
FIG. 10 illustrates the generalized spacing-arc method of the invention.

Alternatively, the spacing computation may be based on any one of several reference geometries: an airspace/sector boundary, a fixed line, or a fixed arc from a reference fix/airport. FIG. 10 illustrates an algorithmic implementation for a reference-arc based computation.

Note that there are three dimensions of "options" needed to provide ATC facilities with the flexibility to adapt the automation to specific airspace applications and site preferences for the display of advisories. One of the three dimensions was just addressed, namely the option regarding the "spacing reference" calculation (i.e., reference fix of FIG. 9 vs. reference arc of FIG. 10). The other two dimensions have to do with the nature of the spacing computation.

The first of these two dimensions has to do with whether the spacing calculation for a stream is "rolling" or "fixed." "Rolling" means that the spacing computation for each flight in a "stream" is based on the first aircraft in the stream. As each flight passes the spacing fix, the designation of the "first" flight "rolls" to the next flight in sequence (so if an aircraft arrives out of conformance, any "residual" spacing error is dropped and the next flight in sequence sets the new reference for all following flights). "Fixed" means that the spacing for all aircraft is defined by the flight that was the first in the stream. In other words, as the first flight crosses the spacing reference, any residual spacing "non-conformance" is not dropped; the spacing computation for each sequential flight is based on the crossing of the original first flight (all sequencial spacing calculations are corrected to reflect the actual crossing of the original lead flight).

The second of the two dimensions has to do with whether the spacing calculation for a stream is "absolute" or "relative." "Absolute" refers to the "spacing-distance" calculation and means that the spacing calculation reflects the along-path distance from the aircraft to the spacing reference. For example, a perfect 20-mile-spaced stream would show the first aircraft to be "X" miles from the spacing reference, the second aircraft X+20 miles, and the third X+40 miles (and so on). The "relative" spacing between any two flights is simply the difference between their "absolute" spacings.

The preferred embodiment is a system according to the invention employing a "rolling-absolute" spacing calculation with a spacing reference based on either a fix or an arc. However, considerations for any particular implementation or location may merit different choices for the three dimensions.

The graphical display of the invention automatically updates the predicted spacing while simultaneously displaying any conflicts predicted by the conflict-probe function. The controller may then use the CTAS trial-planning capability to plan actions for spacing conformance while simultaneously resolving any predicted conflicts. This integration allows the controller to create and implement a conflict-free plan for spacing conformance. This capability also provides the controller with a flexible tool for managing complex merge problems even if MIT-spacing restrictions are not in effect.

The present invention is also of the addition of automatic "meet-spacing" advisory capabilities to reduce controller work in manually trial planning spacing conformance solutions. CTAS currently can provide controllers with automation advisories to meet a time for any one aircraft (using speed, altitude changes, and path-stretch vectoring) and automated speed advisories for the spacing of arrival flights. The present invention introduces automated advisories (a la EDA milestone 5.10 techniques) to advise combined speed, altitude, and/or path-stretch vectors to achieve spacing conformance, applying the "meet-time" capability developed for EDA "meet-time" to the en route spacing problem. The preferred capabilities of the present invention include: (1) Speed advisories for which the automation calculates adjustments in climb, cruise, and/or descent speed (as appropriate) to meet the spacing requirement; (2) Graphical advisory display indicating the speed-control envelope (i.e., a graphical display showing the range of spacing that can be achieved with speed for each flight (which depends on the path/distance, speed, and performance capability of each flight); (3) Automated path-stretch advisory to compute the "added" path to absorb delay needed (above that absorbable with speed and altitude) to conform with spacing; (4) Semi-automated altitude advisories to determine what new altitude will bring a flight into spacing conformance, and if altitude change is not enough, to determine how much spacing delay is achieved with an altitude change (and thus provide information for the controller to combine altitude changes with speed and path control advisories; and (5) Manual (trial plan) capability to direct/constrain the set of speed/altitude/path advisories to be consistent with controller desires (essentially this gives the controller the ability to adapt the advisories, on a per flight basis, to their individual preferences and practices). Once identified as useful to the en route spacing problem, addition of these capabilities to CTAS and like systems can be accomplished without undue effort by one of ordinary skill in the art.

Another important feature of the present invention concerns an ability to specify the streams of aircraft that are being monitored by a controller. In current practice, MIT-spacing restrictions are delegated to individual control sectors by the ATC facilities traffic management personnel. The traffic manager either establishes the restriction (to address a problem within their facility's airspace), or simply facilitates the implementation of a restriction that is delegated to them (i.e., a "passback") from a neighboring ATC facility or the FAA's ATC System Command Center (ATCSCC). In either case, the local traffic manager defines the stream to be restricted in terms of the flights to be impacted, a reference fix for spacing, and the time/distance horizon within which specific sectors must begin maneuvering aircraft. Typically, the flights are identified by a combination of noting specific callsigns and/or a stream (e.g., all flights with a common flight plan element such as a common destination or routing).

The present invention helps to automate the stream/aircraft identification process, by permitting an appropriate traffic manager to input the stream characteristics. The impacted flights are identified at the traffic manager level, permitting distribution of the appropriate data for display at each impacted sector. Preferably, the set of all controlled traffic is continually analyzed (such as via standard ATC host computer all-flight-all-track (AFAT) interface communications) flights belonging to a stream defined by the traffic manager are continually updated. Additional flights outside the envelope of a traffic manager's stream definition can also be added by direct identification of flights via keyboard input of flight identification and/or graphical selection on a plan view display of traffic. Operational considerations may require the system to support controller inputs to manually add or remove a specific flight from a spacing stream. Preferably, the invention also accesses the ATC host computer's designation of the controlling sector that "owns" each restricted flight (again, such as via standard host AFAT interface). Based on the analysis, the invention outputs the spacing advisory data to each sector position via network connection to each sector's display suite (currently referred to as the Display System Replacement (DSR)). Depending on the preferences of each sector controller, they may configure the data to display only data for restricted flights under their control and/or all data for all flights within a stream (when displayed as a list) in order to visualize the relative positions of the flights within their sector compared to sequentially neighboring flights in other sectors. As each controller uses the invention's capability to plan and implement their spacing-conformance maneuvers, the invention updates the traffic manager's display to indicate (either graphically or alphanumerically) the spacing conformance within each restricted stream.

Industrial Applicability

The invention is further illustrated by the following non-limiting example.

EXAMPLE 1

Figure 11:
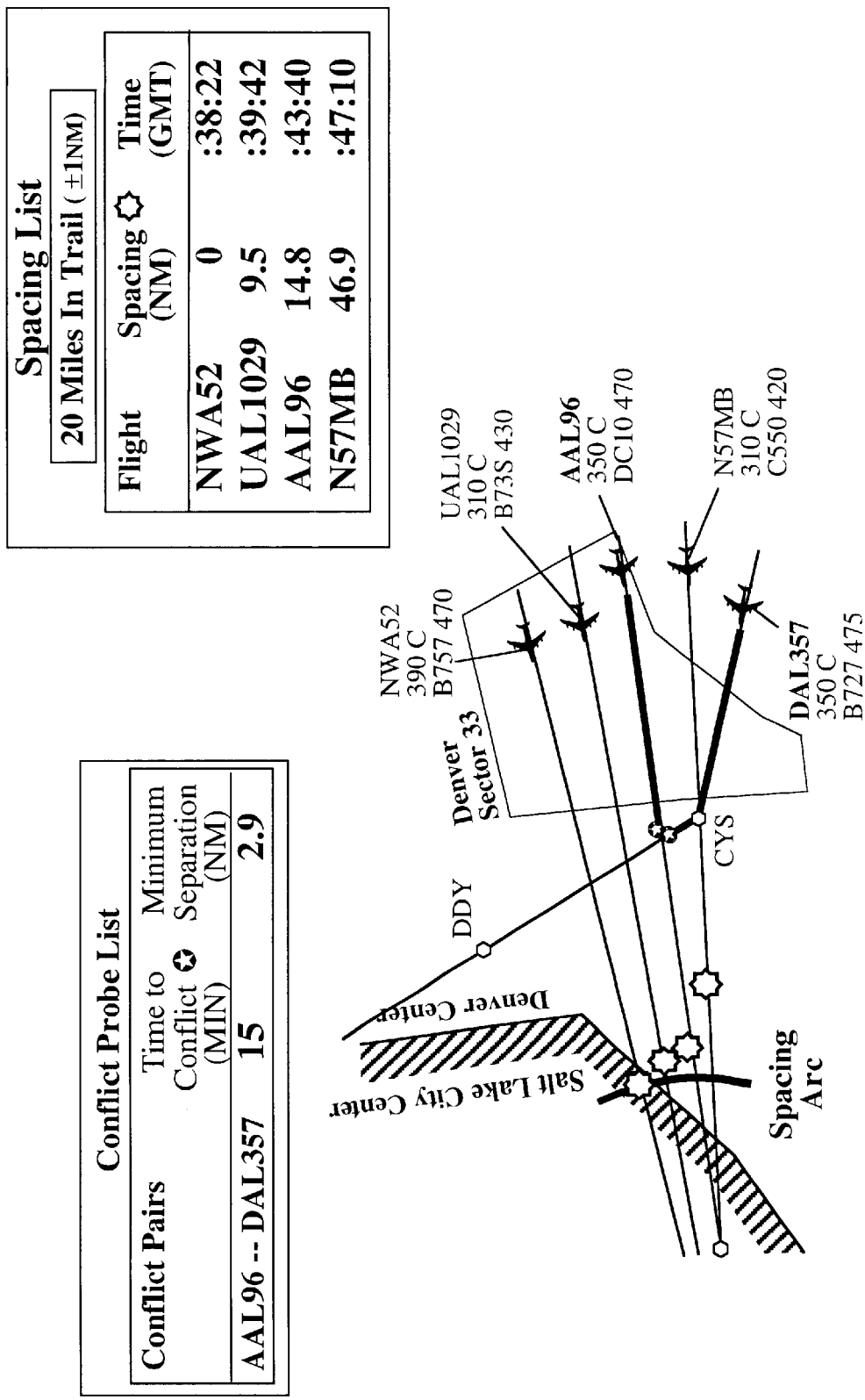
FIG. 11 illustrates the system of the invention in use for a particular en route spacing problem using conflict probe without spacing conformance.
Figure 12:
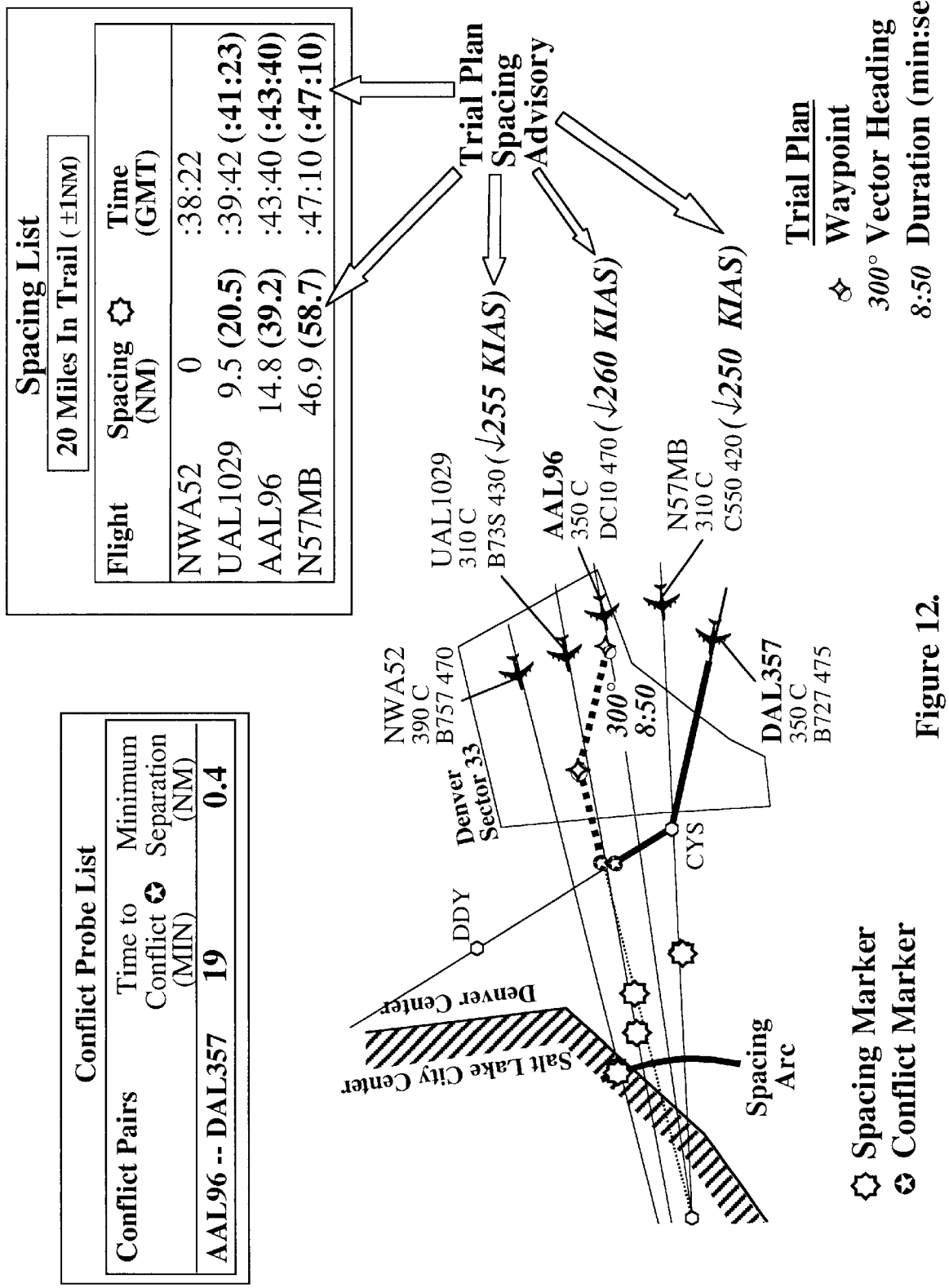
FIG. 12 illustrates the system of the invention in use for the example of FIG. 11, but using conflict probe with spacing conformance.
Figure 13:
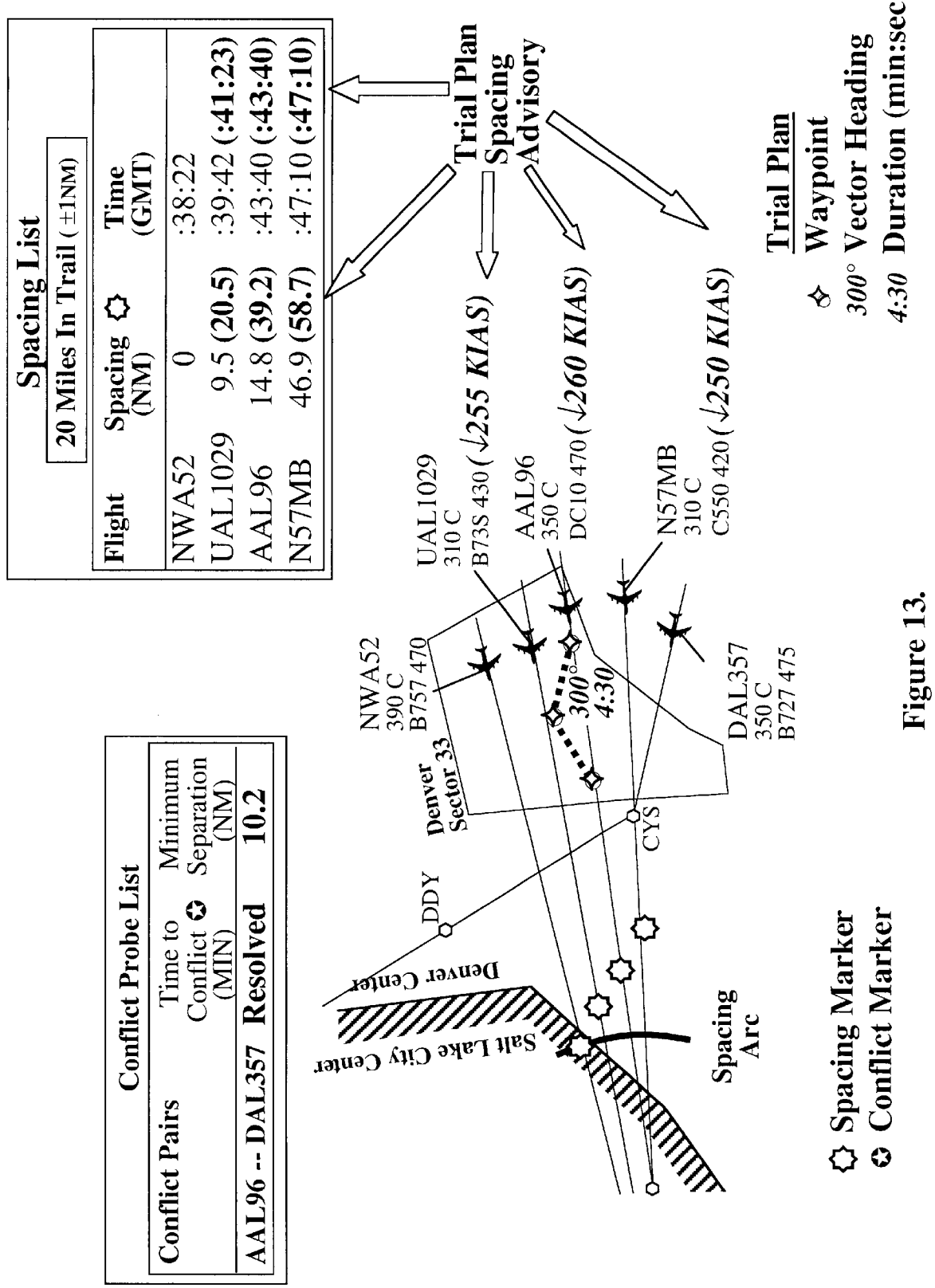
FIG. 13 illustrates the system of the invention in use for the example of FIG. 11, but illustrating conflict-free spacing conformance.

Referring to FIGS. 11–13, the following example scenario illustrates the integration of MIT-spacing conformance of the invention with conflict detection and resolution. The figures represent a simplified depiction of the tool's graphical interface from a 1996 version of CTAS. Note that the figures illustrate the spacing data in a tabular list, but the same data could also or instead be displayed on the aircraft's data tag. Providing an option to a controller permits the controller see all the data in one location even if aircraft are graphically located all over the display (or are off the display), or lets the controller see the data for each aircraft on the aircraft's tag which is located graphically where the aircraft position is.

To reiterate, the display of spacing-conformance analysis may be accomplished in a variety of ways depending on the operational considerations of the ATC facilities and controllers using the tool (or the operational limitations of the ATC computer/display infrastructure capabilities). The display method illustrated in the FIGS. 11–13 places the spacing-conformance data in a spacing list and via graphical spacing markers. Alternative methods include, but are not limited to, the display of the alphanumeric spacing data on: (1) the primary traffic ("R"-side) display on the flight data tags (as an optional field within one of the 3 standard data-tag lines, or an optional 4th line); (2) the primary traffic ("R"-side) display on or near the aircraft target; (3) flight-progress strips (either current-art paper strips and/or future-art "electronic" strips; (4) URET CCLD displays ("graphic" or "plans" displays); or (5) similar display implementations on controller display features developed in the future.

Spacing-conformance data may be displayed in terms of each flight's projected spacing position (absolute or relative spacing) and/or projected spacing-conformance error (i.e., the difference between the desired spacing, according to the flow restriction, and the projected spacing of each aircraft). For example, the fourth flight in a stream restricted to 20 nm spacing must either be "absolutely" spaced at 60 nm (with the first flight establishing the "0" nm spacing position) or "relatively" spaced 20 nm behind the preceding third aircraft. If the fourth flight was perfectly spaced, it would have a spacing error of 0 nm. If the flight were projected to have a spacing position of 55 nm (absolute) or 15 nm (relative), the spacing error would be +5 nm (5 nm ahead of the conformance position. Display of this projected spacing-error state provides the controller with a direct indication of the "residual" spacing error that remains to be addressed.

The example involves the northern portion of the Denver Center airspace centered on sector 33, a sort of cross roads for transcontinental traffic. The scenario focuses on a simulated traffic problem involving the five flights depicted in FIG. 11. Four of the flights are destined for the Northern California Bay Area (San Francisco, San Jose, and Oakland airports). A fifth flight, DAL 357, is destined for Seattle along a route that crosses the paths of the westbound traffic.

DAL 357 is a conventionally-equipped B-727 that is navigating with ground-based navigational aids along jet airways (hence the slight zig-zag in its routing). NWA52 (B-757) and UAL1029 (B-737-300) are equipped with flight management systems (FMS) and are navigating along NRP flight plans comprised of a series of direct segments along a "best-wind" path. AAL96 is a DC10, with area navigation (RNAV) capability, flying direct on a NRP flight plan. N57MB is a conventionally-equipped Citation Jet. The data block for each flight indicates the flight's call sign, flight level (line 2), and ground speed in knots (line 3). The following scenario is based on standard atmosphere and zero-wind conditions.

The scenario begins with all five flights progressing along their flight-plan routes. FIG. 11 depicts a conflict probe of the situation. The conflict-probe list indicates that the separation between AAL96 and DAL357 is predicted to fall below minimums in 15 min. The minimum-separation distance is predicted to be 2.9 nm. This conflict-probe alert is based on the current flight plan and track data for each flight.

However, the scenario is far more interesting when a MIT-spacing initiative is considered for the Bay-Area arrivals. For the purposes of this illustration, it is assumed that terminal-area delays (due to fog) have propagated upstream and forced Salt Lake City Center to place a restriction on Denver Center. The restriction requires that a spacing of 20 MIT be established on all Bay-Area landing traffic before the hand off at the Salt Lake boundary.

For this situation, the spacing function is invoked for the four westbound flights. The Cherokee navigational aid (CKW), just inside Denver airspace, is selected as the spacing-reference fix by the TMC. Results from the spacing analysis are depicted graphically (FIG. 11) with spacing markers. The markers indicate the predicted position of each restricted flight when the lead flight is predicted to pass abeam the reference fix. As the lead flight crosses the reference fix, the next flight in the sequence becomes the lead.

A precise representation of the spacing analysis is also presented in the flow-restriction list (upper right corner of the figure). The list displays each flight in the order of its arrival time, abeam the reference fix, along with a prediction of its equivalent "in-trail" spacing and arrival time. The spacing is displayed here in terms of the "total" spacing for each flight relative to the lead flight. The total spacing represents the predicted along-track range to go to the reference fix when the lead flight is predicted to cross the reference fix. An alternative approach is to display the relative spacing between each succeeding flight based on the difference between the "total" spacing of each succeeding flight. An additional option (not shown here) is to display the spacing error in terms of the difference between the predicted and desired spacing values for each flight.

The flow-restriction list indicates that the first flight, NWA52, is predicted to cross CKW at 38 min and 22 sec after the hour. The following flights are all predicted to arrive early relative to the 20 nm spacing restriction. UAL 1029 is predicted to have an equivalent in-trail spacing of 9.5 nm with the lead flight and is therefore 10.5 nm "early." AAL96 is predicted to be 25.2 nm early, based on a total spacing of 14.8 nm (5.3 nm behind UAL1029), while N57MB is predicted to be 13.1 nm early, based on a total spacing of 46.9 nm (22.1 nm behind AAL96). Clearly, the flight plans used for the conflict probe do not reflect the future actions necessary to bring UAL1029, AAL96, and N57MB into MIT-spacing conformance.

FIG. 12 shows the same traffic situation after initial trial planning for spacing conformance. The trial plan calls for UAL 1029 to reduce speed to 255 knots indicated airspeed (KIAS). This action, if implemented, would reduce UAL1029's ground speed by 21 knots (resulting in a 20.5 nm spacing without deviating from the user's preferred path). The tool also indicates that a speed reduction to 250 KIAS (400 knots ground speed) would bring N57MB into MIT-spacing conformance. That action would result in a total spacing of 58.7 nm also while keeping N57MB on its preferred path.

For AAL96 however, only part of the delay will be absorbed by a speed reduction. For the purposes of this example, the speed reduction will be limited to 260 KIAS (443 knots ground speed) to illustrate the use of vectors. Such a speed reduction would result in a total spacing of 27.5 nm or 12.5 nm early for AAL96. For the remainder of the spacing, the controller would use the graphical user interface to generate a combined vector and speed solution. As the controller "stretches" the path graphically, the spacing feedback helps the controller zero in on a conformance solution. The resulting plan for AAL96 calls for a turn to a heading of 300 degrees (for 8 min and 50 sec), followed by a turn to 254 degrees to rejoin the user's preferred route.

With the tool-based spacing-conformance plans generated, the conflict probe will have an accurate model of intent upon which to base any conflict predictions. In this case (FIG. 12), the automation still predicts a conflict between AAL96 and DAL357, albeit at a later time (19 min). For a complete solution, the controller could use the trial planner while combining the feedback from the spacing and separation predictions.

FIG. 13 illustrates the controller's final solution. AAL96's path-stretch vector was adjusted to achieve separation with DAL357. This plan calls for AAL96 fly a heading of 300 degrees (for 4 min 30 sec), followed by a turn to 240 degrees to rejoin the user's preferred route. The final plan achieves spacing conformance while resolving the conflict between AAL96 and DAL357 with a minimum separation of 10.2 nm. The automation feedback helps the controller minimize the extent of the deviations to get the job done.

Approximately 45,000 flights per month are impacted by dynamic MIT-spacing restrictions throughout U.S. airspace. Significant potential exists for reducing user deviations, fuel burn, and the controller workload associated with today's procedures for spacing conformance. Analysis indicates potential airspace-user benefits of the invention of at least $45 million per year in fuel savings alone. Furthermore, the integration of the en route spacing system and method of the invention with conflict probe will significantly reduce the probe's false-alarm and missed-alert rates during spacing operations. These potential benefits are of particular value because they are achieved during flow-rate constrained operations, precisely the time when airspace users are impacted by deviations from their preferred trajectories.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of minimizing aircraft deviations needed to comply with an en route miles-in-trail spacing requirement imposed during air traffic control operations, the method comprising the steps of:
   a) establishing a spacing reference geometry;
   b) predicting spatial locations of a plurality of aircraft at a predicted time of intersection of a path of a first of said plurality of aircraft with the spacing reference geometry; and
   c) determining spacing of each of the plurality of aircraft based on the predicted spatial locations.

2. The method of claim 1 wherein the establishing step comprises establishing a spacing reference geometry selected from the group consisting of fixed waypoints, including navaids, airway intersections, and predetermined latitude/longitude positions, airspace sector boundaries, arcs defined in reference to an airport or other geographical location, spatial lines, and combinations of spatial line segments.

3. The method of claim 1 additionally comprising the step of displaying the predicted spatial locations.

4. The method of claim 1 additionally comprising the step of displaying the determined spacing of each of the plurality of aircraft.

5. The method of claim 4 wherein the displaying step comprises displaying the determined spacing of each of the plurality of aircraft in an alphanumeric format at a location selected from the group consisting of on a predetermined location on a display in list form, on the flight data tags of a primary traffic ("R"-side) display, on the primary traffic ("R"-side) display on or near the aircraft target, on flight-progress strips, and on URET CCLD displays.

6. The method of claim 1 additionally comprising the step of setting a proposed alteration in flight characteristics of one or more of the plurality of aircraft and performing steps b) and c) based upon the proposed alteration, thereby providing feedback as to conformance of the proposed alteration with the spacing requirement.

7. The method of claim 6 wherein the setting step comprises setting a proposed alteration in flight characteristics selected from the group consisting of course, speed, altitude, and combinations thereof.

8. The method of claim 6 additionally comprising the step of employing a conflict probe to predict aircraft conflicts in view of the proposed alteration.

9. The method of claim 1 additionally comprising the step of permitting a controller to specify whether the determining step employs spacing calculation parameters selected from the group consisting of rolling spacing, fixed spacing, absolute spacing-distance, and relative-spacing distance parameters.

10. The method of claim 1 additionally comprising the step of imposing a meet-spacing requirement, whereby changes to course, speed, and altitude for one or more of the plurality of aircraft are automatically proposed to a controller that would meet the spacing requirement.

11. The method of claim 1 additionally comprising the step of selecting the plurality of aircraft by matching aircraft to input stream characteristics.

12. The method of claim 11 wherein the selecting step additionally comprises directly identifying flights by controller input.

13. The method of claim 11 wherein the selecting step is performed at repeated intervals.

14. The method of claim 1 additionally comprising the step of reporting spacing advisory data to other controllers responsible for monitoring each aircraft.

15. Computer software for minimizing aircraft deviations needed to comply with an en route miles-in-trail spacing requirement imposed during air traffic control operations, said software comprising:
   means for establishing a spacing reference geometry;
   means for predicting spatial locations of a plurality of aircraft at a predicted time of intersection of a path of a first of said plurality of aircraft with said spacing reference geometry; and
   means for determining spacing of each of said plurality of aircraft based on said predicted spatial locations.

16. The software of claim 15 wherein the establishing means comprises means for establishing a spacing reference geometry selected from the group consisting of fixed waypoints, including navaids, airway intersections, and predetermined latitude/longitude positions, airspace sector boundaries, arcs defined in reference to an airport or other geographical location, spatial lines, and combinations of spatial line segments.

17. The software of claim 15 additionally comprising means for displaying the predicted spatial locations.

18. The software of claim 15 additionally comprising means for displaying the determined spacing of each of the plurality of aircraft.

19. The software of claim 18 wherein the displaying means comprises means for displaying the determined spacing of each of the plurality of aircraft in an alphanumeric format at a location selected from the group consisting of on a predetermined location on a display in list form, on the flight data tags of a primary traffic ("R"-side) display, on the primary traffic ("R"-side) display on or near the aircraft target, on flight-progress strips, and on URET CCLD displays.

20. The software of claim 15 additionally comprising means for setting a proposed alteration in flight characteristics of one or more of the plurality of aircraft and performing steps b) and c) based upon the proposed alteration, thereby providing feedback as to conformance of the proposed alteration with the spacing requirement.

21. The software of claim 20 wherein the setting means comprises means for setting a proposed alteration in flight characteristics selected from the group consisting of course, speed, altitude, and combinations thereof.

22. The software of claim 20 additionally comprising conflict probe means to predict aircraft conflicts in view of the proposed alteration.

23. The software of claim 15 additionally comprising means for permitting a controller to specify whether the determining step employs spacing calculation parameters selected from the group consisting of rolling spacing, fixed spacing, absolute spacing-distance, and relative spacing distance parameters.

24. The software of claim 15 additionally comprising means for imposing a meet-spacing requirement, whereby changes to course, speed, and altitude for one or more of the plurality of aircraft are automatically proposed to a controller that would meet the spacing requirement.

25. The software of claim 15 additionally comprising means for selecting the plurality of aircraft by matching aircraft to input stream characteristics.

26. The software of claim 25 wherein the selecting means additionally comprises means for directly identifying flights by controller input.

27. The software of claim 25 wherein the selecting means can be executed at repeated intervals.

28. The software of claim 15 additionally comprising means for reporting spacing advisory data to other controllers responsible for monitoring each aircraft.

29. The software of claim 15 wherein said software is a modular component of a Center-TRACON Automation System.

30. Computer media comprising the computer software of claim 15.

31. A method in a computer system for interactively minimizing aircraft deviations needed to comply with an en route miles-in-trail spacing requirement, comprising:
  one or more central processing units for processing air traffic control data;
  one or more displays for presenting processed data;
  one or more input devices for receiving raw and processed data;
  means for interactively receiving air traffic controller specification of spacing calculation parameters,
  an en route miles-in-trail planning software component that determines the spacing of aircraft according to the air traffic controller specified spacing calculation parameters and thereby minimizing aircraft deviations to comply with a spacing requirement; and
  a conflict probe component.

32. A computer system, for minimizing aircraft deviations needed to comply with an en route miles-in-trail spacing requirement, configured to:
  a) establish a spacing reference geometry;
  b) predict spatial locations of a plurality of aircraft at a predicted time of intersection of a path of a first of said plurality of aircraft with the spacing reference geometry; and
  c) determine spacing of each of the plurality of aircraft based on the predicted spatial locations.

* * * * *